United States Patent
Takagi et al.

(10) Patent No.: US 9,746,055 B2
(45) Date of Patent: Aug. 29, 2017

(54) CHAIN TENSIONER

(71) Applicant: TSUBAKIMOTO CHAIN CO., Osaka-shi, Osaka (JP)

(72) Inventors: Yasuyuki Takagi, Osaka (JP); Osamu Yoshida, Osaka (JP); Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 128 days.

(21) Appl. No.: 14/810,872

(22) Filed: Jul. 28, 2015

(65) Prior Publication Data

US 2016/0061299 A1 Mar. 3, 2016

(30) Foreign Application Priority Data

Aug. 26, 2014 (JP) ................................ 2014-171550

(51) Int. Cl.
*F16H 7/08* (2006.01)

(52) U.S. Cl.
CPC ... *F16H 7/0848* (2013.01); *F16H 2007/0802* (2013.01)

(58) Field of Classification Search
CPC ................ F16H 7/0848; F16H 7/0836; F16H 2007/0802
See application file for complete search history.

(56) References Cited

U.S. PATENT DOCUMENTS

| | | | | |
|---|---|---|---|---|
| 2004/0266571 A1* | 12/2004 | Izutsu | ................... | F16H 7/0848 474/110 |
| 2006/0094548 A1* | 5/2006 | Sato | ..................... | F16H 7/0848 474/109 |
| 2006/0281595 A1* | 12/2006 | Narita | .................. | F16H 7/0848 474/109 |
| 2007/0213152 A1* | 9/2007 | Yamamoto | ............ | F16H 7/0848 474/109 |
| 2008/0261736 A1* | 10/2008 | Onimaru | ............... | F16H 7/0848 474/110 |
| 2010/0222167 A1* | 9/2010 | Chekansky | ........... | F16H 7/0836 474/110 |

(Continued)

FOREIGN PATENT DOCUMENTS

JP 2001-146946 A 5/2001
JP 2002-5249 A 1/2002

*Primary Examiner* — William E Dondero
*Assistant Examiner* — Robert T Reese
(74) *Attorney, Agent, or Firm* — Westerman, Hattori, Daniels & Adrain, LLP

(57) ABSTRACT

An object of the present invention is to provide a chain tensioner which enables operations on an elastic ring member during assembly and maintenance work to be readily performed and which is capable of eliminating protrusion of an operating portion of the elastic ring member in a direction opposite to a mounting surface, with a simple configuration. A ring holding portion 112 provided on an open side of a plunger housing hole 111 includes a pressing projection 113 and a restricting portion 114 which restrict rotation of the elastic ring member 130 and which oppose both outer sides of a pair of operating portions 132 of the elastic ring member 130 in a circumferential direction, and the pressing projection 113 is arranged at a position closer to a mounting surface 115 than the restricting portion 114.

4 Claims, 7 Drawing Sheets

(56) References Cited

U.S. PATENT DOCUMENTS

2012/0040790 A1\* 2/2012 Perissinotto .......... F16H 7/0836
　　　　　　　　　　　　　　　　　　　　　474/110
2012/0309570 A1\* 12/2012 Kurematsu ........... F16H 7/0848
　　　　　　　　　　　　　　　　　　　　　474/110
2013/0190117 A1\* 7/2013 Bauer ....................... F16H 7/08
　　　　　　　　　　　　　　　　　　　　　474/111

\* cited by examiner

CHAIN TENSIONER

BACKGROUND OF THE INVENTION

1. Field of the Invention

The present invention relates to a chain tensioner which includes a tensioner body having a plunger housing hole opened at one end, a cylindrical plunger to be slidably inserted into the plunger housing hole, and biasing means for biasing the plunger in a protruding direction, and which holds tension of a chain at a proper value.

2. Description of the Related Art

Conventionally, it is common practice to use a chain tensioner that holds tension of a chain at a proper value. For example, there is a known chain guide mechanism that uses a travel guide shoe to slidingly guide a transmission chain such as a roller chain being endlessly wound around sprockets respectively provided on a crankshaft and a camshaft inside an engine room, wherein a swinging chain guide that includes the travel guide shoe is biased by a chain tensioner in order to hold tension of the chain at a proper value.

For example, as shown in FIG. 11, a timing chain CH is endlessly wound between a drive sprocket S1 mounted to a crankshaft and a pair of driven sprockets S2 and S3 mounted to a camshaft inside an engine room, and the timing chain CH is guided by a swinging chain guide G1 and a fixed chain guide G2 to constitute a chain guide mechanism.

The fixed chain guide G2 is fixed inside the engine room by two mounting shafts B1 and B2, and the swinging chain guide G1 is mounted inside the engine room to be swingable within a winding plane of the timing chain CH around a mounting shaft B0.

A chain tensioner 500 holds tension of the timing chain CH at a proper value and suppresses vibration by pressing the swinging chain guide G1.

As the known chain tensioner 500 that is used in such chain guide mechanisms, a chain tensioner is known in which: a plunger is used which includes, on an outer peripheral surface thereof, a plurality of annular grooves that are engageable by an elastic ring member; a ring holding portion that holds the elastic ring member is provided on an open side of a plunger housing hole, and the elastic ring member is held by the ring holding portion and elastically engages the annular grooves of the plunger to constitute a ratchet-type backstop mechanism (refer to Japanese Patent Application Laid-open No. 2002-5249, Japanese Patent Application Laid-open No. 2001-146946, and the like).

Maintenance work of a chain guide mechanism using such a chain tensioner 500 may involve adjusting a position of the plunger by enlarging a diameter of the annular elastic portion of the elastic ring member. In doing so, the diameter of the annular elastic portion of the elastic ring member is to be enlarged through a maintenance hole in a state where the chain tensioner is mounted to an engine or the like.

In addition, even during assembly of the chain tensioner, after the elastic ring member is set to the ring holding portion, the diameter of the annular elastic portion of the elastic ring member is enlarged and the plunger is inserted.

SUMMARY OF THE INVENTION

An operation for enlarging the diameter of the elastic ring member during maintenance of such a known chain tensioner is performed in a state where working space is insufficient due to the chain tensioner being still mounted to the engine or the like and requires operating the operating portion through the maintenance hole that is a small window.

When using an elastic ring member (for example, Japanese Patent Application Laid-open No. 2002-5249: "register ring 7") of a type in which a pair of operating portions intersect each other, the pair of operating portions are to be held by a pair of pliers or the like in order to enlarge the diameter of the annular elastic portion. In addition, when using an elastic ring member (for example, Japanese Patent Application Laid-open No. 2001-146946: "register clip 12") of a type in which a pair of operating portions do not intersect each other, a dedicated operation tool is to be used in order to enlarge the diameter of the annular elastic portion.

Since these operations involve operating a pair of pliers or a dedicated operation tool through a small maintenance hole, there is a problem that work efficiency is low. In addition, since maintaining the annular elastic portion in a diameter-enlarged state requires continuously operating the pair of operating portions using the pair of pliers or the dedicated operation tool, there is also a problem that maintenance work consumes time.

In addition, in the case of an elastic ring member of a type in which a pair of operating portions do not intersect each other, since positions of both operation portions are susceptible to change due to a gap that exists between a notched portion and the pair of operating portions, there is a problem that an operation involving inserting the operation tool between the pair of operating portions and holding the operation tool in that state is difficult.

Furthermore, even during assembly of the chain tensioner, the elastic ring member must be maintained in a diameter-enlarged state in order to insert the plunger. Therefore, automating assembly requires a complicated mechanism and control.

Moreover, due to the operating portions of the elastic ring member protruding in a direction of the maintenance hole from the tensioner body (a direction opposite to the mounting surface to the engine or the like), a space corresponding to the protrusion must be secured as a mounting space of the chain tensioner, thereby inhibiting downsizing of the engine or the like in which the chain tensioner is used.

The present invention solves these problems and an object thereof is to provide a chain tensioner which enables operations on an elastic ring member during assembly and maintenance work to be readily performed and which is capable of eliminating protrusion of an operating portion of the elastic ring member in a direction opposite to a mounting surface with a simple configuration.

A chain tensioner according to the present invention solves the problems described above by being configured as a chain tensioner including a tensioner body having a plunger housing hole opened at one end, a cylindrical plunger to be slidably inserted into the plunger housing hole, and biasing means for biasing the plunger in a protruding direction, wherein the plunger includes, on an outer peripheral surface thereof, a plurality of annular grooves that are engageable by an elastic ring member, a ring holding portion that holds the elastic ring member is provided on an open side of the plunger housing hole, the elastic ring member includes an annular elastic portion and a pair of operating portions for enlarging a diameter of the annular elastic portion, the ring holding portion includes a pressing projection and a restricting portion which restrict rotation of the elastic ring member and which oppose both outer sides of the pair of operating portions in a circumferential direction, the tensioner body includes one mounting surface on an outer surface, and the pressing projection is arranged at a position closer to the mounting surface than the restricting portion.

With the chain tensioner according to present claim 1, due to the ring holding portion including a pressing projection and a restricting portion which restrict rotation of the elastic ring member and which oppose both outer sides of the pair of operating portions in a circumferential direction, and the pressing projection being arranged at a position closer to the mounting surface than the restricting portion, the diameter of the elastic ring member can be enlarged by simply pressing, in a direction of the mounting surface, one of the pair of operating portions that protrudes from a side of the restricting portion. As a result, an operation of the elastic ring member can be readily performed, work efficiency can be improved, and automation can be readily achieved.

In addition, the position of the restricting member can be set such that one of the pair of operating portions protruding from the side of the restricting portion does not protrude in a direction opposite to the mounting surface of the operating portions of the elastic ring member. As a result, a contribution can be made to downsizing of an engine or the like in which the chain tensioner is used.

With the configuration according to present claim 2, due to the pair of operating portions of the elastic ring member being respectively formed in a crank shape, an interval of the pair of operating portions can be increased while increasing an arc length of the annular elastic portion in a state where the diameter of the elastic ring member is reduced. As a result, a ratchet-type backstop mechanism can be operated more reliably and work efficiency can be improved.

With the configuration according to present claim 3, due to a relief recess that houses the first arm portion and the second bent portion of the operating portion when the diameter of the elastic ring member is enlarged being formed on the pressing projection on the side of the plunger housing hole, interference when the diameter of the elastic ring member is enlarged can be avoided, and a length of the second arm portion of the operating portion can be set longer and the diameter of the elastic ring member can be enlarged to a greater degree. As a result, an engagement with the annular grooves of the plunger can be reliably released when the diameter of the elastic ring member is enlarged and work efficiency can be improved.

With the configuration according to present claim 4, due to a thick walled portion being formed on the restricting portion on the side of the plunger housing hole, a notch of the plunger housing hole can be reduced to cause the elastic ring member and the annular grooves of the plunger to engage each other in a more reliable manner. As a result, the ratchet-type backstop mechanism can be operated, the strength of the restricting portion is increased, and the strength of the tensioner body is also increased.

With the configuration according to present claim 5, due to the pressing projection including a pressing surface in a same direction as a direction in which the third arm portion extends when the elastic ring member is held, the third arm portion of the operating portion on the side of the pressing projection is pressed against the pressing surface in a stable manner when the third arm portion of the operating portion on the side of the restricting member is pressed to enlarge the diameter of the elastic ring member. As a result, the diameter of the elastic ring member can be reliably enlarged without causing the elastic ring member to incline.

With the configuration according to present claim 6, due to the first arm portions of the pair of operating portions being formed so as to extend while being inclined with respect to one another, the diameter of the elastic ring member can be enlarged without causing the pair of operating portions to come into contact with each other. As a result, the diameter of the elastic ring member can be reliably enlarged without causing twisting of the annular elastic portion, an engagement with the annular grooves of the plunger can be reliably released when the diameter of the elastic ring member is enlarged, and work efficiency can be improved.

DESCRIPTION OF THE PREFERRED EMBODIMENTS

Figure 1:
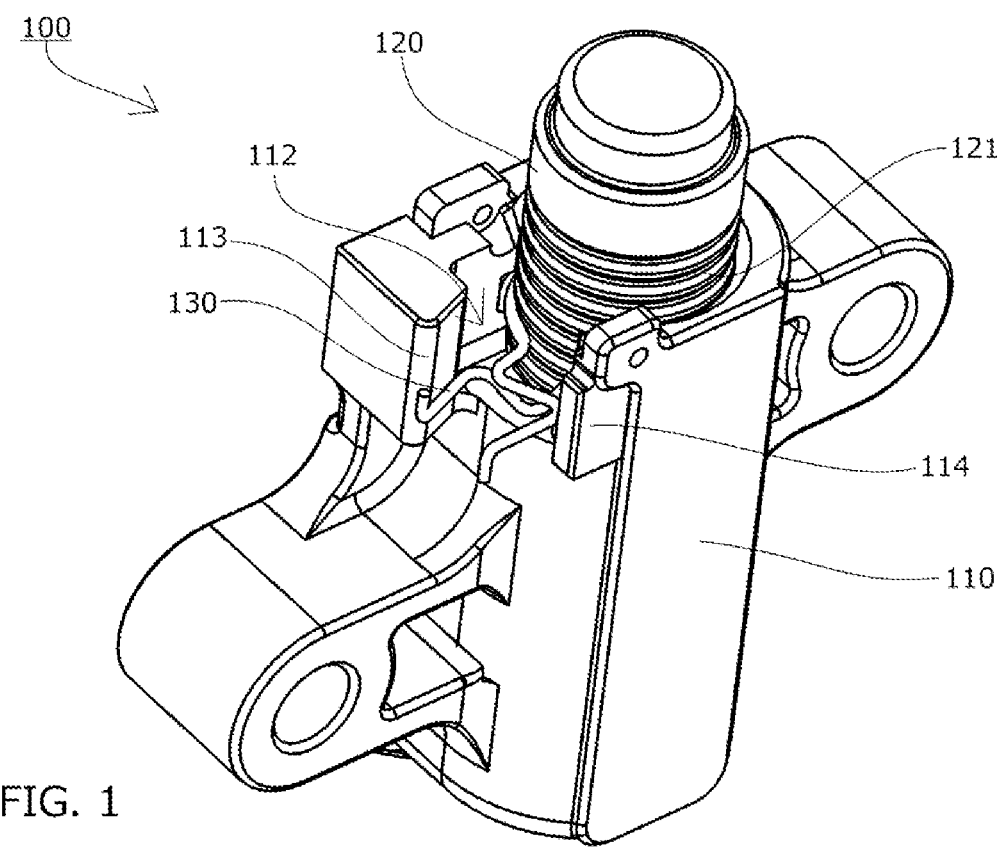
FIG. 1 is a perspective view of a chain tensioner according to an embodiment of the present invention.
Figure 2:
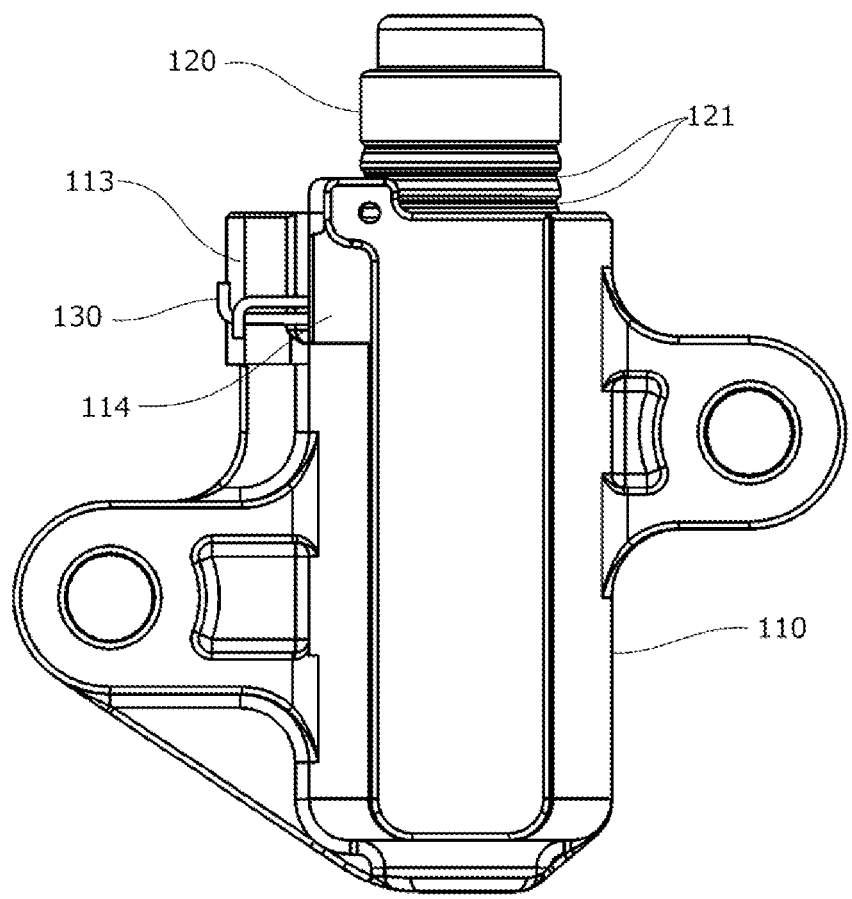
FIG. 2 is a front view of a chain tensioner according to an embodiment of the present invention.

A chain tensioner according to the present invention is a chain tensioner including a tensioner body having a plunger housing hole opened at one end, a cylindrical plunger to be slidably inserted into the plunger housing hole, and biasing means for biasing the plunger in a protruding direction, wherein the plunger includes, on an outer peripheral surface thereof, a plurality of annular grooves that are engageable by an elastic ring member, a ring holding portion that holds the elastic ring member is provided on an open side of the plunger housing hole, the elastic ring member includes an annular elastic portion and a pair of operating portions for enlarging a diameter of the annular elastic portion, the ring holding portion includes a pressing projection and a restricting portion which restrict rotation of the elastic ring member and which oppose both outer sides of the pair of operating portions in a circumferential direction, the tensioner body includes one mounting surface on an outer surface, and the pressing projection is arranged at a position closer to the mounting surface than the restricting portion. The chain tensioner can assume any specific configuration as long as the chain tensioner enables operations on an elastic ring member during assembly and maintenance work to be readily performed and is capable of eliminating protrusion of an operating portion of the elastic ring member in a direction opposite to a mounting surface with a simple configuration.

Embodiment

As shown in FIGS. 1 to 10, a chain tensioner 100 according to an embodiment of the present invention includes a tensioner body 110 having a plunger housing hole 111 opened at one end, a cylindrical plunger 120 to be slidably inserted into the plunger housing hole 111, and biasing means (not shown) such as a spring mechanism or a hydraulic mechanism that biases the plunger 120 in a protruding direction.

As shown in FIGS. 1 to 5 and 7, the plunger 120 includes a plurality of annular grooves 121 that are engageable by an elastic ring member 130 on an outer peripheral surface of the plunger 120.

A ring holding portion 112 that holds the elastic ring member 130 is provided on an open side of the plunger housing hole 111 of the tensioner body 110.

In addition, a mounting surface 115 that enables the tensioner body 110 to be mounted to an engine or the like is formed on one surface on an outer periphery of the tensioner body 110.

Figure 8:
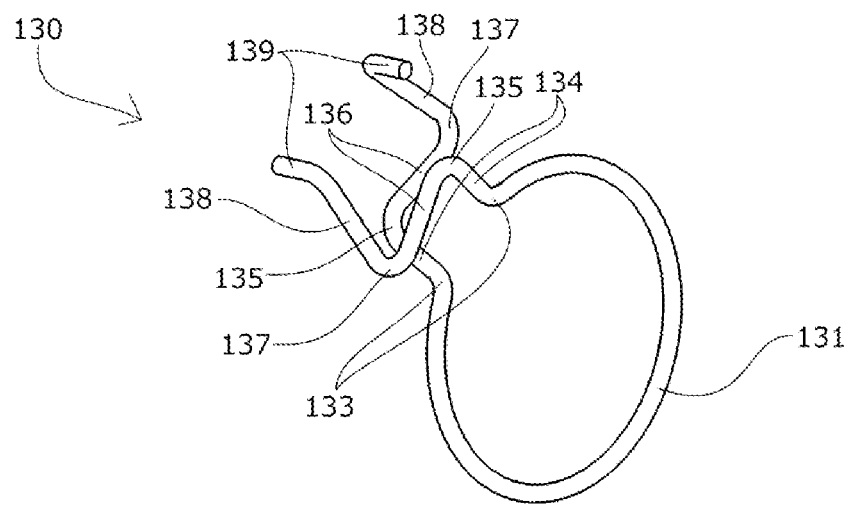
FIG. 8 is a perspective view of an elastic ring member of a chain tensioner according to an embodiment of the present invention.
Figure 9:
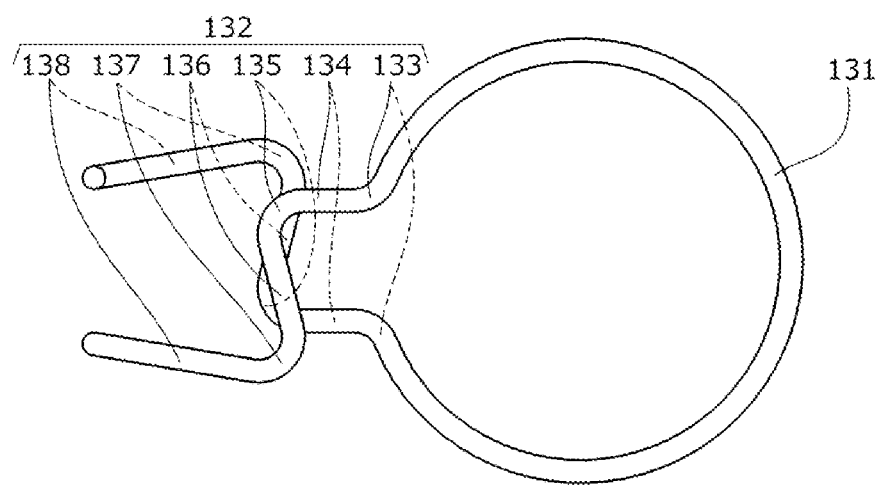
FIG. 9 is a plan view of an elastic ring member of a chain tensioner according to an embodiment of the present invention.
Figure 10:
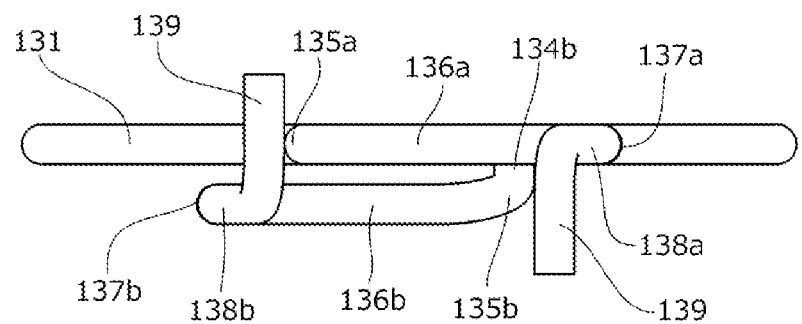
FIG. 10 is a front view of an elastic ring member of a chain tensioner according to an embodiment of the present invention.
Figure 11:
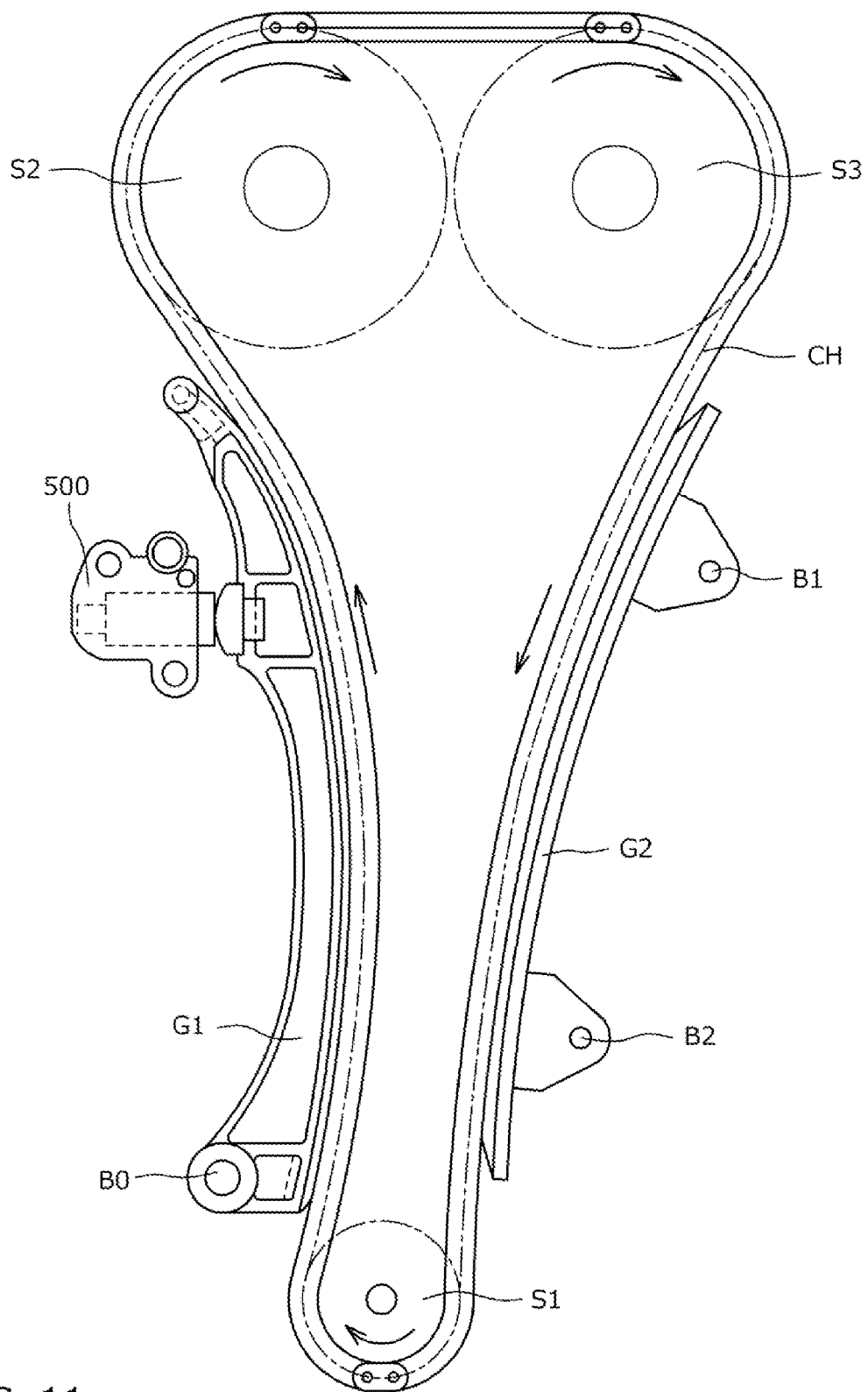
FIG. 11 is an explanatory diagram of a chain guide mechanism used in a chain guide mechanism of an engine.

As shown in FIGS. 8 to 10, the elastic ring member 130 includes an annular elastic portion 131 and a pair of operating portions 132 for enlarging a diameter of the annular elastic portion 131.

The pair of operating portions 132 are respectively formed in a crank shape including a first arm portion 134 that bends toward an outer peripheral side from the annular elastic portion 131 at a first bent portion 133, a second arm portion 136 that bends from the first arm portion 134 at a second bent portion 135, and a third arm portion 138 that bends from the second arm portion 136 at a third bent portion 137.

In the present embodiment, the first arm portions 134 of the pair of operating portions 132 are formed so as to extend while being inclined with respect to one another.

In other words, as shown in FIG. 10, a second arm portion 136a and a third arm portion 138a of one operating portion 132 are formed so as to be positioned on a circumferential surface of the annular elastic portion 131, and due to a first arm portion 134b of the other operating portion 132 extending while being inclined, a second arm portion 136b and a third arm portion 138b are formed so as to be positioned on a plane that is parallel to the circumferential surface of the annular elastic portion 131.

In addition, in the present embodiment, tip bent portions 139 that are bent in different directions are respectively formed on a tip side of the third arm portions 138 of one operating portion 132.

Figure 6:
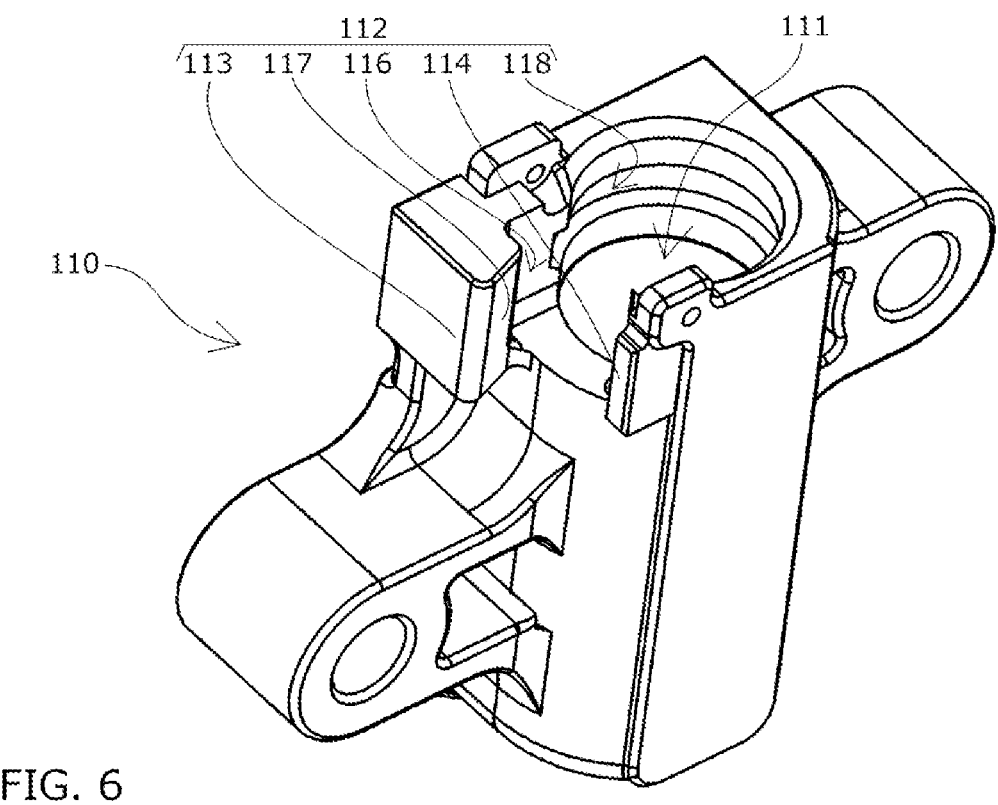
FIG. 6 is a perspective view of a tensioner body of a chain tensioner according to an embodiment of the present invention.
Figure 7:
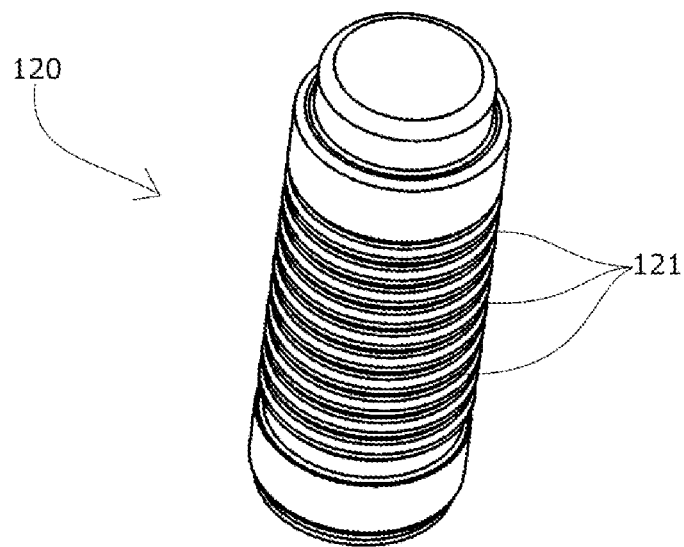
FIG. 7 is a perspective view of a plunger of a chain tensioner according to an embodiment of the present invention.

As shown in FIG. 6, the ring holding portion 112 that is provided on an open side of the plunger housing hole 111 of the tensioner body 110 includes a ring holding groove 118 which is provided on an inner periphery of the plunger housing hole 111 and to which the annular elastic portion 131 of the elastic ring member 130 can be fitted, and a pressing projection 113 and a restricting portion 114 which restrict rotation of the elastic ring member 130 and which oppose both outer sides of the pair of operating portions 132 of the elastic ring member 130 in a circumferential direction.

The pressing projection 113 and the restricting portion 114 are formed by notching the tensioner body 110 from an open side of the plunger housing hole 111 to below the ring holding groove 118 so as to enable the pair of operating portions 132 of the elastic ring member 130 to be housed from the open side, and the pressing projection 113 is arranged at a position closer to the mounting surface 115 of the tensioner body 110 than the restricting portion 114.

The pressing projection 113 and the restricting portion 114 are both provided so as to be abutted by the third arm portions 138 of the operating portions 132 when the elastic ring member 130 is fitted to the ring holding groove 118.

Figure 3:
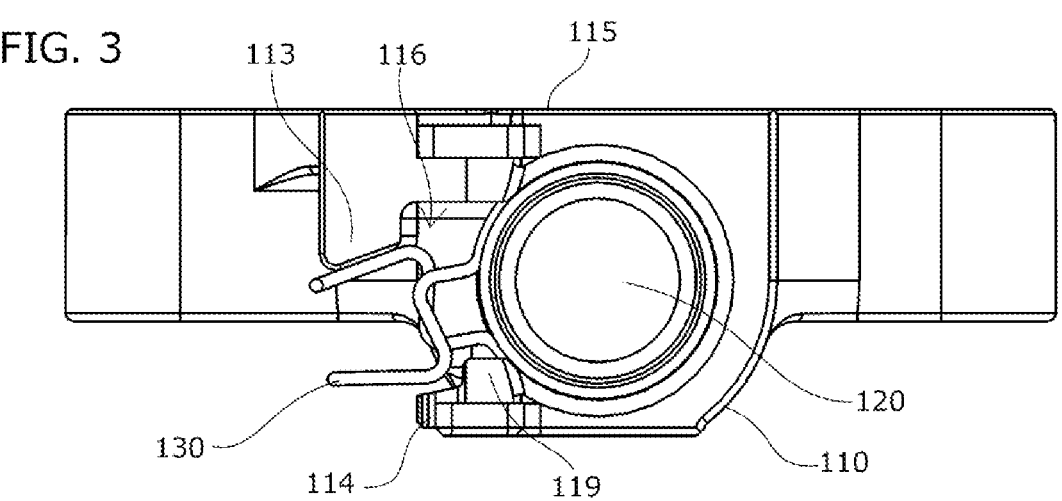
FIG. 3 is a plan view of a chain tensioner according to an embodiment of the present invention.
Figure 4:
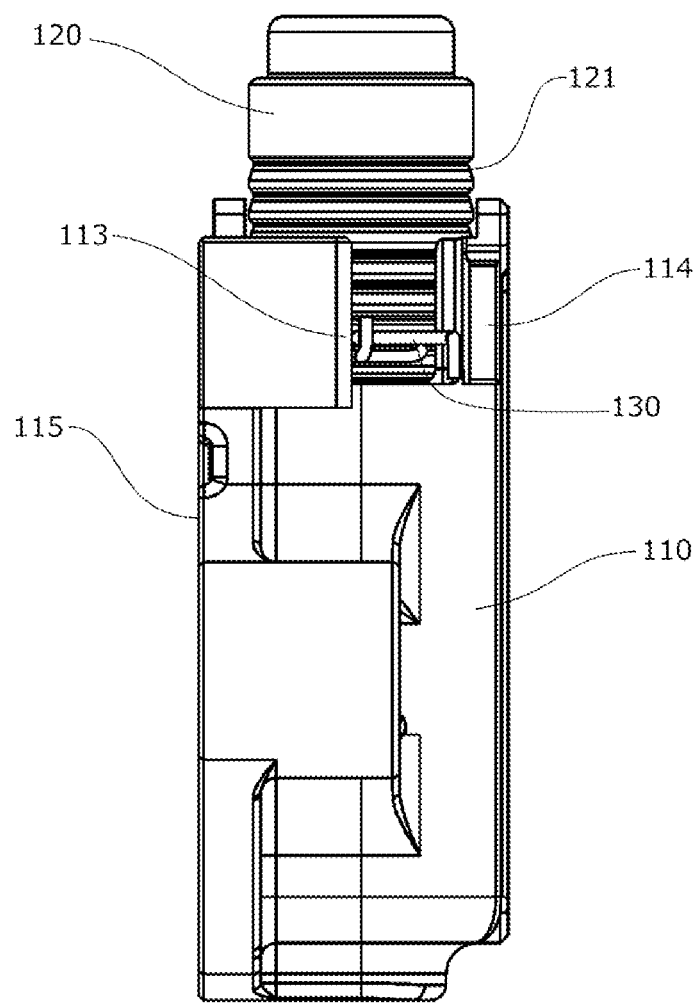
FIG. 4 is a side view of a chain tensioner according to an embodiment of the present invention.
Figure 5:
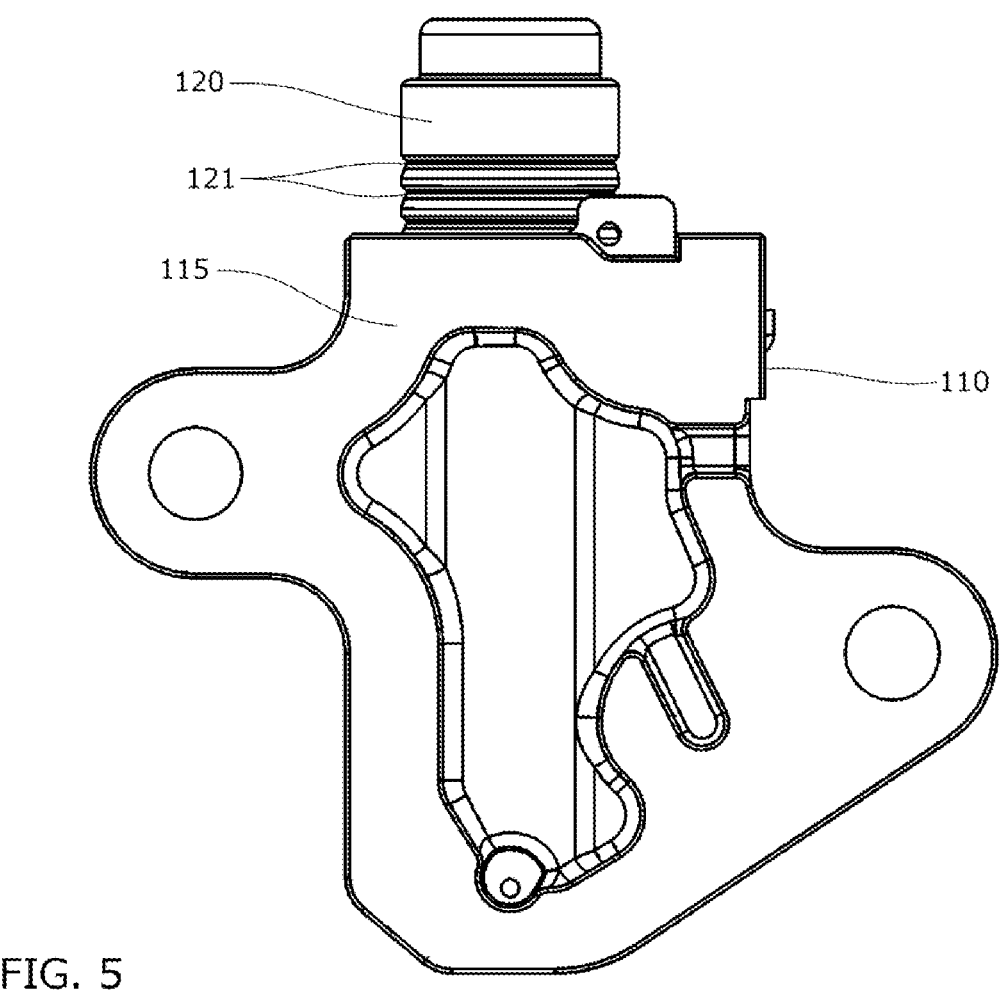
FIG. 5 is a rear view of a chain tensioner according to an embodiment of the present invention.

As shown in FIGS. 3 and 6, the pressing projection 113 includes a pressing surface 117 in a same direction as a direction in which one of the third arm portions 138 of the held elastic ring member 130 extends when the third arm portion 138 abuts the pressing projection 113.

In addition, a relief recess 116 that houses the first arm portion 134 and the second bent portion 135 of the other operating portion 132 when the diameter of the elastic ring member 130 is enlarged is formed on the pressing projection 113 on the side of the plunger housing hole 111.

As shown in FIG. 3, a thick walled portion 119 that protrudes toward a side of the annular elastic portion 131 from the second arm portion 136 when abutted by the other third arm portion 138 of the held elastic ring member 130 is formed on the restricting portion 114 to increase strength of the restricting portion and to increase strength of the tensioner body 110.

Shapes of the tensioner body 110 and the elastic ring member 130 are formed such that the other third arm portion 138 of the elastic ring member 130 becomes approximately parallel to the mounting surface 115 of the tensioner body 110 in a state where one third arm portion 138 of the held elastic ring member 130 abuts the pressing projection 113.

Accordingly, the diameter of the elastic ring member 130 can be enlarged by simply pressing, in a direction of the mounting surface 115, the other third arm portion 138 that protrudes from a side of the restricting portion 114. As a result, an operation of the elastic ring member 130 can be readily performed.

In addition, since the other third arm portion 138 that protrudes from the side of the restricting portion 114 does not protrude at all in a direction opposite to the mounting surface 115 of the tensioner body 110, a contribution can be made to downsizing of an engine or the like in which the chain tensioner 100 is used.

Furthermore, since the elastic ring member 130 has a shape that is approximately symmetrical both vertically and horizontally, the elastic ring member 130 can be held in any direction. As a result, the number of operational steps during assembly can be reduced.

While the embodiment described above represents a specific example of the chain tensioner according to the present invention, the chain tensioner according to the present invention is not limited to the embodiment described above, and various modifications can be made including, but not limited to, shapes, positions, dimensions, and arrangement relationships of the respective components. Alternatively, the chain tensioner according to the present invention may be configured by combining such modifications as appropriate.

In addition, the chain tensioner according to the present invention is not limited to a transmission mechanism using a chain and may be applied to similar transmission mechanisms using a belt, a rope, and the like, and can be utilized in various industrial fields.

What is claimed is:
1. A chain tensioner comprising a tensioner body having a plunger housing hole opened at one end, a cylindrical plunger to be slidably inserted into the plunger housing hole, and biasing means for biasing the plunger in a protruding direction, wherein the plunger includes, on an outer peripheral surface thereof, a plurality of annular grooves that are engageable by an elastic ring member, a ring holding portion that holds the elastic ring member is provided on an open side of the plunger housing hole, the elastic ring member includes an annular elastic portion and a pair of operating portions for enlarging a diameter of the annular elastic portion, the ring holding portion includes a pressing projection and a restricting portion which restrict rotation of the elastic ring member and which oppose both outer sides of the pair of operating portions in a circumferential direction, the tensioner body includes one mounting surface on an outer surface, and the pressing projection is arranged at a position closer to the mounting surface than the restricting portion, the pair of operating portions of the elastic ring member are respectively formed in a crank shape including a first arm portion that bends towards an outer peripheral side from the annular elastic portion at a first bent portion, a second arm portion that bends from the first arm portion at a second bent portion, and a third arm portion that bends from the second arm portion at a third bent portion, and a relief recess that houses the first arm portion and the second bent portion of the operating portion when the diameter of the elastic ring member is enlarged is formed on the pressing projection on the side of the plunger housing hole.

2. The chain tensioner according to claim 1, wherein a thick walled portion is formed on the restricting portion on the side of the plunger housing hole.

3. The chain tensioner according to claim 1, wherein the pressing projection includes a pressing surface in a same direction as a direction in which the third arm portion extends when the elastic ring member is held.

4. The chain tensioner according to claim 1, wherein the first arm portions of the pair of operating portions are formed so as to extend while being inclined with respect to one another.

* * * * *